(12) United States Patent
Cao et al.

(10) Patent No.: US 7,567,543 B2
(45) Date of Patent: Jul. 28, 2009

(54) METHOD AND APPARATUS FOR CROSS LAYER RESOURCE ALLOCATION FOR WIRELESS BACKHAUL NETWORKS

(75) Inventors: Min Cao, Urbana, IL (US); Xiaodong Wang, New York, NY (US); Seung-Jun Kim, Plainsboro, NJ (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 525 days.

(21) Appl. No.: 11/420,137

(22) Filed: May 24, 2006

(65) Prior Publication Data
US 2007/0111757 A1    May 17, 2007

Related U.S. Application Data

(60) Provisional application No. 60/729,775, filed on Oct. 24, 2005.

(51) Int. Cl.
H04W 4/00 (2009.01)
H04M 1/00 (2006.01)

(52) U.S. Cl. .................. 370/338; 370/328; 455/561

(58) Field of Classification Search ............. 370/228, 370/338
See application file for complete search history.

(56) References Cited

U.S. PATENT DOCUMENTS

2004/0157645 A1* 8/2004 Smith et al. ............. 455/562.1
2006/0221920 A1* 10/2006 Gopalakrishnan et al. ... 370/338
2006/0234751 A1* 10/2006 Horng et al. ............. 455/522

OTHER PUBLICATIONS

Nandagopal, T. et al., "Achieving MAC Layer Fairness in Wireless Packet Networks", ACM MOBICOM'00, Boston, MA, Aug. 2000.
Elbatt, T. et al., "Joint Scheduling and Power Control for Wireless Ad-Hoc Networks", IEEE Proceedings of INFOCOM, 2002.
Madan, R. et al., "Distributed Algorithms for Maximum Lifetime Routing in Wireless Sensor Networks", IEEE Communications Society Globecom, 2004.
Madan, R. et al., "Cross-Layer Design for Lifetime Maximization in Interference-Limited Wireless Sensor Networks", Proceedings of INFOCOM, 2005.

(Continued)

*Primary Examiner*—Nick Corsaro
*Assistant Examiner*—Amanuel Lebassi
(74) *Attorney, Agent, or Firm*—Joseph J. Kolodka

(57) ABSTRACT

A method and apparatus is disclosed whereby the scheduling of network transmissions in a wireless backhaul network is determined using a cross-layer optimization algorithm. In a first embodiment, the algorithm assumes a good MAC layer transmit schedule has been provided and computes optimal network layer routes as well as transmit beam patterns and transmit powers in a semi-distributed manner. According to this embodiment, the optimization goal is the throughput from each access point, or node in the network, to the core network. In another embodiment, an independent set of transmitting nodes is determined at the MAC layer in a way such that no link in the set interferes with another link and no link is scheduled to transmit and receive at the same time. According to this embodiment, a column generation algorithm is used to find a maximal weighted independent set and to achieve optimal network transmission throughput.

34 Claims, 6 Drawing Sheets

OTHER PUBLICATIONS

Ochiai, H. et al., "Collaborative Beamforming for Distributed Wireless Ad Hoc Sensor Networks", IEEE Trans. on Signal Processing, vol. 53, issue 11, Nov. 2005.

Fahmy, N. et al., "Ad-Hoc Networks with Smart Antennas Using IEEE 802.11-Based Protocols", IEEE ICC'02, May 2002.

Ramanathan, R. et al., "Ad-Hoc Networking with Directional Antennas: A Complete System Sol'n", IEEE Journal on Selected Areas Comm., vol. 23, issue 3, Mar. 2005.

Kim, S-J., "Space-Time Synchronization and Beamforming for Wireless Communication", PH.D. Dissertation, University of California, Santa Barbara, Jan. 2005.

Kodialam, M. et al., "Characterizing Achievable Rates in Multi-Hop Wireless Networks The Joint Routing and Scheduling Problem", MobiCom, San Diego, CA 2003.

Song, B. et al., "Joint Beamforming, Power Control and Scheduling for Multi-Hop Wireless Networks", Dept. of Computer & Engineering, University of California, San Diego, 2003.

* cited by examiner

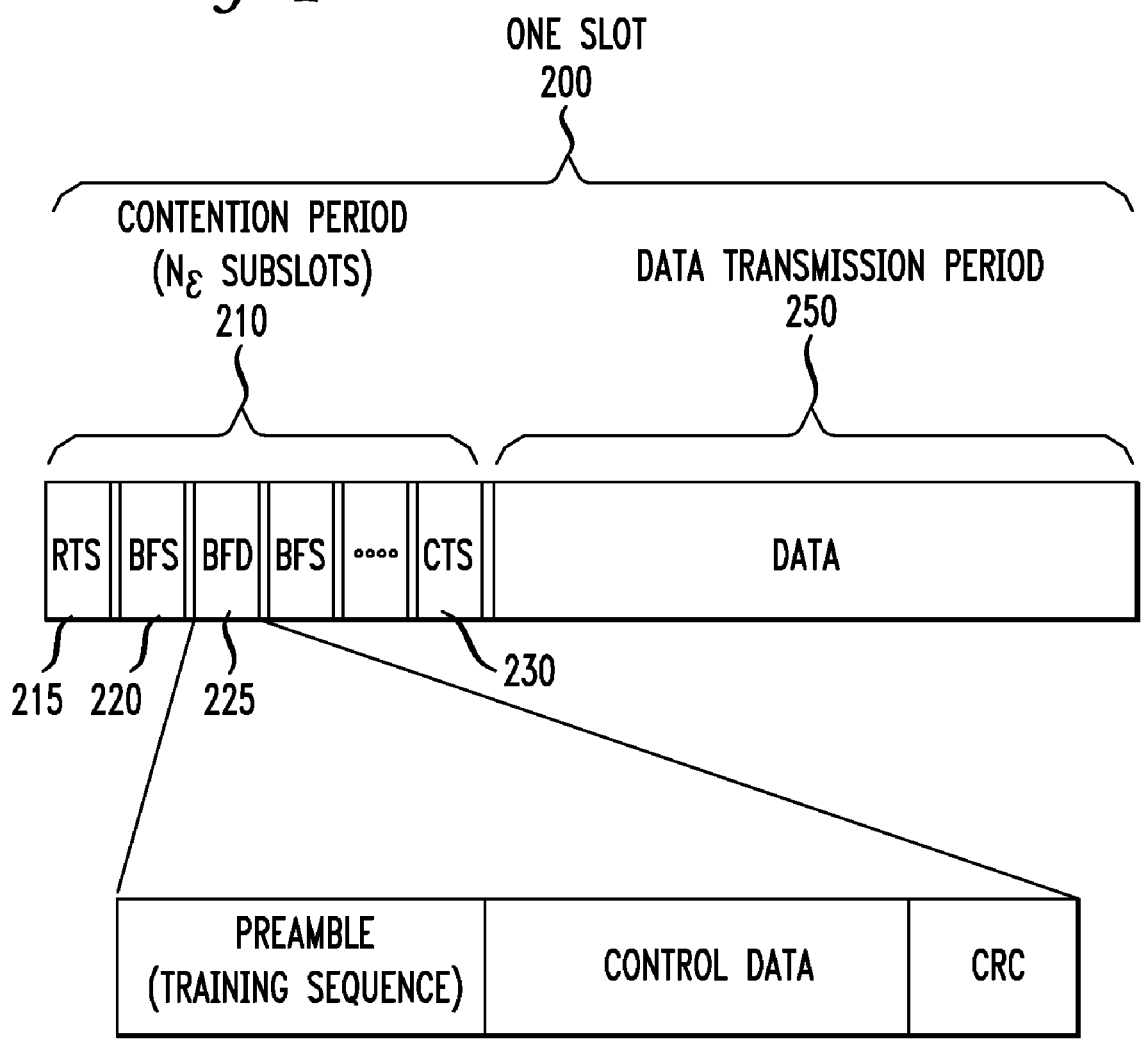

FIG. 3

Input: transmission set $T$, SINR targets $\gamma_i$ for $\ell \in T$
Output: beamformer vectors $w_\ell, g_\ell$, transmit power $P_\ell$ for $\ell \in T$

---

For $q = 1, 2, \ldots, Q$

For each link $\ell \in T$ $m \leftarrow 1$

Do

Update normalized MMSE beamformer at $R(\ell)$ $$w'_\ell(m+1) = \bar{R}_\ell^{-1} H_{R(\ell),T(\ell)} g_\ell(m)$$

$$w_\ell(m+1) \leftarrow \frac{w'_\ell(m+1)}{\|w'_\ell(m+1)\|}$$

$$\tilde{g}_\ell(m+1) \leftarrow \overline{w_\ell(m+1)}$$

Transmit packet from $R(\ell)$ to $T(\ell)$ – Update node $T(\ell)$ beamformer $$\tilde{w}'_\ell(m+1) = \tilde{R}_\ell^{-1} H_{T(\ell),R(\ell)} \tilde{g}_\ell(m+1)$$

$$\tilde{w}_\ell(m+1) \leftarrow \frac{\tilde{w}'_\ell(m+1)}{\|\tilde{w}'_\ell(m+1)\|}$$

$$g_\ell(m+1) \leftarrow \overline{\tilde{w}_\ell(m+1)}$$

$m \leftarrow m + 1$

While $\|g_\ell(m) - g_\ell(m-1)\| > \delta$ $m_\ell \leftarrow m$

Update beamformers $g_\ell \leftarrow g_\ell(m_\ell)$, $w_\ell \leftarrow w_\ell(m_\ell)$, $\tilde{g}_\ell \leftarrow \tilde{g}_\ell(m_\ell)$, $\tilde{w}_\ell \leftarrow \tilde{w}_\ell(m_\ell)$ Transmit estimated SINR $\Gamma_\ell$ from $R(\ell)$ to $T(\ell)$ and $\tilde{\Gamma}_\ell$ from $T(\ell)$ to $R(\ell)$ Update transmit powers $P_\ell \leftarrow P_\ell \gamma_\ell / \Gamma_\ell$ and $\tilde{P}_\ell \leftarrow \tilde{P}_\ell \gamma_\ell / \tilde{\Gamma}_\ell$ Next $\ell$ Next $q$

FIG. 4

For $k = 1, 2, \ldots$ $$s_n^{*(k)} = \left[\left(-T v_n^{(k)} + \sum_{\ell \in O(n)} \lambda_\ell^{(k)} - \sum_{\ell \in I(n)} \lambda_\ell^{(k)}\right)^{-1}\right]^+, \; n \in S$$

$$x_\ell^{t*(k)} = \left[-\frac{1}{2\epsilon}\left(v_{T(\ell)}^{(k)} - v_{R(\ell)}^{(k)} + \mu_\ell^{t(k)}\right)\right]^+, \; \ell \in T_t, \; t=1, \ldots, T$$

$$v_n^{(k+1)} = v_n^{(k)} + \alpha_k \left[\sum_t \left(\sum_{\ell \in T_t \cap O(n)} x_\ell^{t*(k)} - \sum_{t \in T_t \cap I(n)} x_\ell^{t*(k)}\right) - T s_n^{*(k)}\right]^+, \; n \in S$$

$$\lambda_\ell^{(k+1)} = \lambda_\ell^{(k)} + \alpha_k \left[s_{T(\ell)}^{*(k)} - s_{R(\ell)}^{*(k)}\right], \; \ell \in \mathcal{L}_s$$

$$P_\ell^{t(k+1)} = \left[P_\ell^{t(k)} + \alpha_k \left(x_\ell^{t*(k)} - C_\ell^{t*(k)}\right)\right]^+, \; \ell \in T_t, \; t=1, 2, \ldots, T$$

Update PHY parameters:

For $t = 1, 2, \ldots, T$, $$r^{t(k+1)} = r^{t(k)} + \alpha_k \left(P_{sum} - \sum_{\ell \in T_t} P_\ell^{t(k)}\right)$$

Set target SINR $\gamma_\ell^t$ for $\ell \in T_t$ using (36), (38) or (39)

Call IMMSE subroutine in Figure 3 with input $T_t$ and $\{\gamma_\ell^t\}$.

Next $t$

Next $k$

FIG. 6

601 — 1. $T_k = \Phi, \overline{T} = L;$

602 — 2. select $l^* = \text{argmax}_{l \in \overline{T}} \ \pi_l$, let $\overline{L}(l^*)$ be the set of links in primary conflict with $l^*$, let $T_k = T_k \cup \{l^*\}$, $\overline{T} = \overline{T} \setminus \overline{L}(l^*);$ 603 — 3. repeat step 2 until $\overline{T} = \Phi$, now we get a primary conflict free maximal IS $T_k;$ 604 — 4. use the IMMSE algorithm to check the feasibility of $T_k$, if infeasible, let $l'$ be the link with the lowest SINR, $T_k = T_k \setminus \{l'\};$ 605 — 5. repeat step 4 until we get a secondary conflict free maximal IS $T_k$.

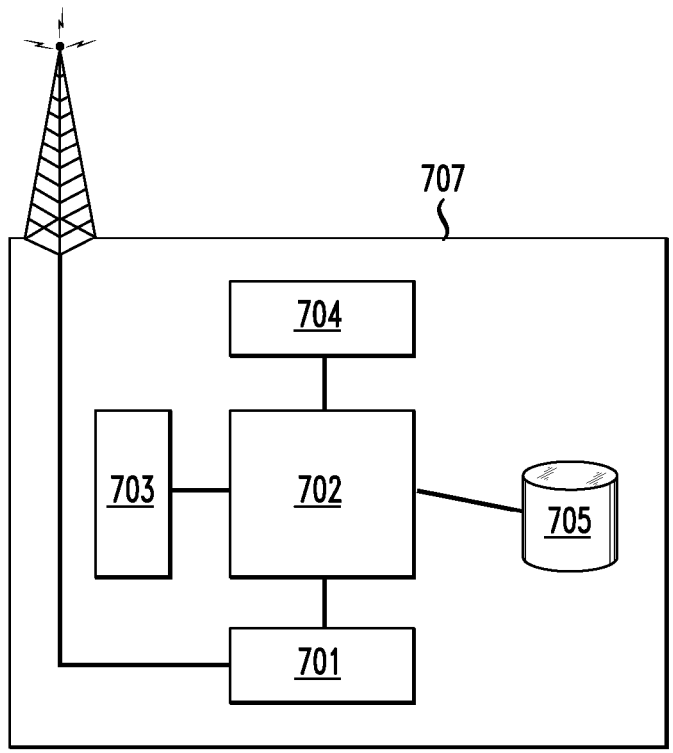

FIG. 7

METHOD AND APPARATUS FOR CROSS LAYER RESOURCE ALLOCATION FOR WIRELESS BACKHAUL NETWORKS

This application claims the benefit of U.S. Provisional Application No. 60/729,775, filed Oct. 24, 2005, which is hereby incorporated herein by reference.

BACKGROUND OF THE INVENTION

The present invention relates generally to medium access control in communication networks.

Wireless data networks are used in many different applications as a cost-effective solution for transporting data from one point to another. Such networks are typically characterized by many individual users located at nodes distributed over a geographic area. Such networks typically use an access point (AP) based architecture in which APs aggregate wireless data from users within a certain geographic region and then transport this aggregated data traffic over a backhaul network from the APs to a core network, such as a service provider's network. In many cases, the service provider's network is the Internet. In some implementations, data from a user must make multiple wireless hops between access points and other network nodes before reaching the core network. With the increasing adoption of high-speed wireless access technologies such as the well known 3G and IEEE 802.11a/g wireless technologies, such multi-hop wireless backhaul networks are emerging as a cost-effective solution to meet the requirements of broadband wireless access. Compared with wired networks, wireless backhaul networks not only significantly reduce network deployment cost, but also enable fast and flexible network configuration. Furthermore, a multi-hop wireless architecture, also referred to herein as a mesh network, can extend network coverage and provide increased reliability due to the existence of multiple routes between source and destination nodes. Such an alternative routing potential ensures high network availability when node or link failures occur or when channel conditions are poor.

For multi-hop wireless networks, a significant factor limiting network capacity is the interference between neighboring network links and nodes. One technique for overcoming these limitations uses multiple cooperating antennas to increase the throughput and/or substantially reduce the transmit power of the communication system. Such techniques may be implemented, illustratively, using well-known Multiple Input, Multiple Output (MIMO) algorithms at the physical layer (PHY) of a backhaul network to exploit phenomena such as multipath propagation to increase throughput, or reduce bit error rates, rather than attempting to eliminate effects of multipath propagation distortion. Such techniques are useful to reduce the impact of interference on neighboring nodes as well as to reduce the required transmit power for a signal.

Due to the high volume of wireless data traffic in such networks, wireless radio resource allocation becomes increasingly complex. Specifically, in many cases neighboring links cannot be actively transmitting simultaneously due to the aforementioned interference between neighboring transmissions (also referred to herein as secondary conflicts) as well as the half-duplex characteristic of the wireless transceiver (also referred to herein as primary conflicts). Thus, scheduling at the Medium Access Control (MAC) layer in the network becomes increasingly difficult as the number of neighboring links increases. Additionally, since the transmission of data across different wireless links are highly interdependent in multi-hop mesh networks, routing and scheduling are also interrelated. Finally, MAC layer scheduling directly depends on the interference levels which are determined by the physical layer operations. Thus, in today's complex wireless multihop networks, MAC layer scheduling, PHY layer beamforming and network layer routing are interdependent. Prior attempts, however, have typically treated these functions as being independent problems, leading to suboptimal network performance.

SUMMARY OF THE INVENTION

In accordance with the principles of the present invention, network transmissions in a wireless backhaul network are determined using a cross-layer optimization algorithm. In a first embodiment, the algorithm assumes an advantageous MAC layer transmit schedule has been provided and computes optimal network layer routes as well as transmit beam patterns and transmit powers in a semi-distributed manner. According to this embodiment, the optimization goal is the throughput from each access point, or node in the network, to the core network. In another embodiment, an independent set of transmitting nodes is determined at the MAC layer in a way such that no link in the set interferes with another link and no link is scheduled to transmit and receive at the same time. According to this embodiment, a column generation algorithm is used to find a maximal weighted independent set and to achieve optimal network transmission throughput.

These and other advantages of the invention will be apparent to those of ordinary skill in the art by reference to the following detailed description and the accompanying drawings.

BRIEF DESCRIPTION OF DRAWINGS

FIG. 2 illustrates the slot structure of a medium access control method in accordance with an embodiment of the invention;

FIG. 3 is pseudo-code illustrating Iterative Minimum Mean Square Error distributed beamforming;

FIG. 4 is pseudo-code illustrating an algorithm for solving cross-layer scheduling including physical layer consideration;

FIG. 6 is pseudo-code illustrating a systematic and iterative approach for solving cross-layer scheduling including physical layer considerations; and FIG. 7 shows an illustrative computer adapted for use in accordance with an embodiment of the present invention.

DETAILED DESCRIPTION OF THE INVENTION

Figure 1A:
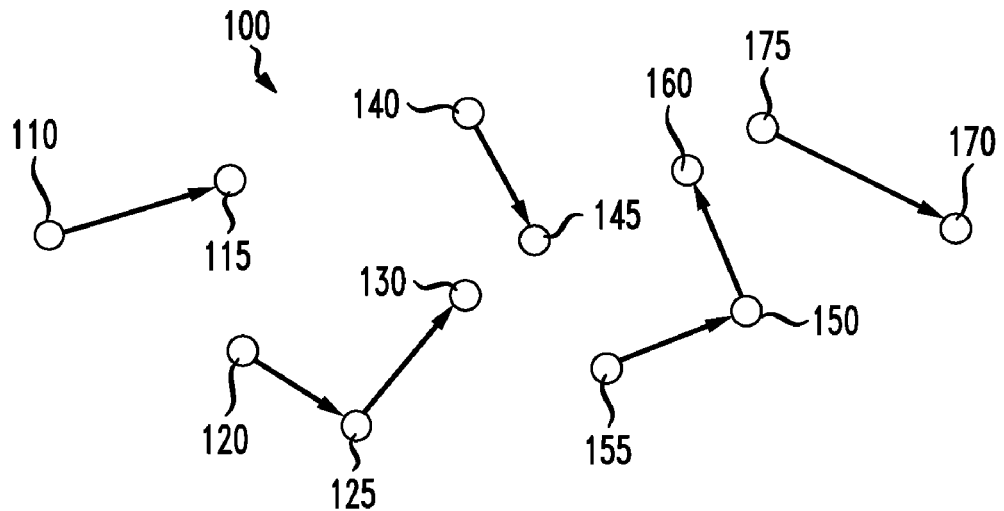
FIGS. 1A and 1B are diagrams illustrating a wireless communication network, suitable for implementing an embodiment of the present invention.

FIG. 1A is a diagram illustrating a wireless communication network 100 suitable for implementing one embodiment of the present invention. Wireless network 100 has, illustratively, a plurality of nodes 110-175, each having one or more wireless antennas, such as the antennas of Access Points (APs) at each node. Nodes 110-175 illustratively have an array of multiple cooperating antennas so as to take advantage of multiple input, multiple output (MIMO) techniques, as discussed above. Each node is, for example and without limitation, a node in a wireless backhaul multi-hop network.

Figure 1B:
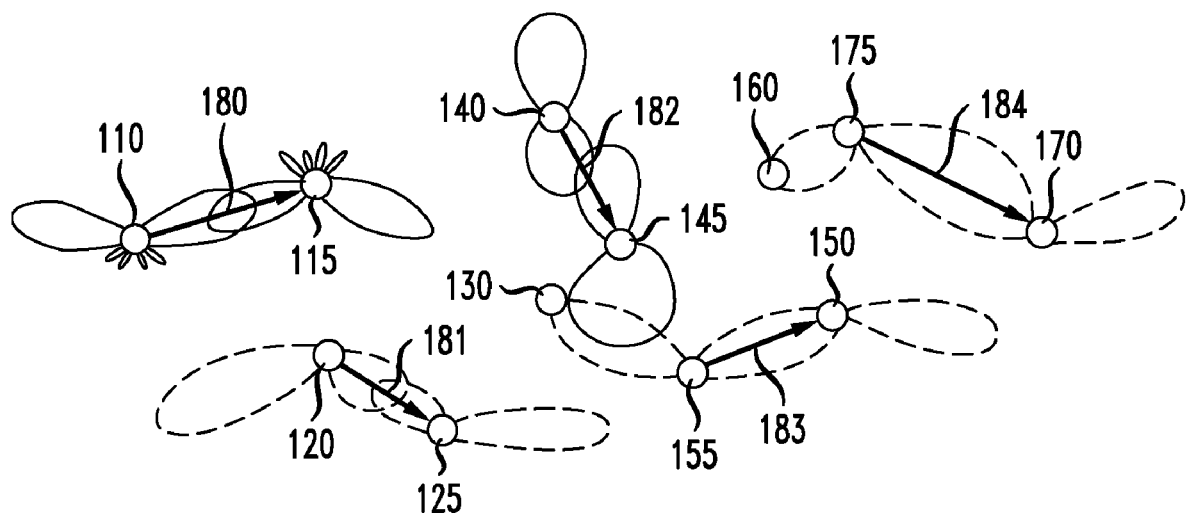

In order to communicate with one another, the nodes 110-175 of FIG. 1A may use the multiple antennas in those nodes to perform adaptive beamforming. As will be familiar to one skilled in the art, adaptive beamforming is a technique in which an array of antennas is able to achieve maximum reception in a specific angular direction by estimating the signal arrival from a desired direction (in the presence of noise) while signals of the same frequency from other directions are rejected. This is achieved by varying the weights of each of the transmitters (antennas) used in the array. The spatial separation of arriving signals is exploited to separate the desired signal from the interfering signals. In adaptive beamforming the optimum weights of the antennas are typically iteratively computed. As is also known to one skilled in the art, beamforming is generally accomplished by phasing the feed to each element of an array so that signals received or transmitted from all elements will be in phase in a particular direction. For example, FIG. 1B shows illustrative beam patterns for the network depicted in FIG. 1A. In particular, that figure shows, for example, illustrative beam patterns for the network depicted in FIG. 1A generated by a beamforming algorithm in which, illustratively, five links 180-184 are scheduled and each node has an array of four antennas. In accordance with one embodiment of the present invention, there is no central control and, therefore, the decision of which links to participate in each array is determined in a distributed manner using only local information. Such adaptive beamforming using an advantageous algorithm in accordance with an embodiment of the present invention is also discussed further herein below.

FIG. 2 shows one illustrative embodiment of how nodes 110-175 of FIGS. 1A and 1B use medium access control to transmit data. Specifically, referring to FIG. 2, access to the wireless transmission medium is provided using transmission slots. Different transmissions from different users (e.g., different nodes) are multiplexed onto the transmission medium using those slots. As one skilled in the art will recognize, the type of transmission slot will depend on the particular multiplexing technique utilized, e.g., the transmission slot would represent a time slot if a time division multiplexing technique is utilized. In FIG. 2, each transmission slot 200 is subdivided into a contention resolution period 210 and a data transmission period 250. During the contention resolution period 210, in accordance with one embodiment of the present invention, the nodes in the network jointly and cooperatively determine advantageous physical layer (PHY) beamforming and power control parameters. One advantageous method useful in performing such beamforming/power control functions during contention period 210 is the Iterative Minimum Mean Square Error (IMMSE) method, which is shown in FIG. 3 and described below, and which is further described in greater detail in S.-J. Kim, "Space-Time Synchronization and Beamforming for Wireless Communication," Ph.D. Dissertation, University of California, Santa Barbara (January 2005), which is hereby incorporated by reference herein in its entirety. One skilled in the art will recognize, however, that the present invention is not limited to any specific beamforming/power control technique and that any such suitable technique may be used with equally advantageous results. During contention period 210 (FIG. 2), using a beamforming/power control technique allows each node to adaptively compute transmit and receive beamforming parameters using only local information while minimizing the transmit power under a signal quality constraint represented by a target signal to interference and noise ratio (SINR). Since such a method can jointly determine the set of beamforming parameters and powers for all links in the network, spatial reuse of the network can illustratively be maximized during contention period 210 and, as a result, the transmit power required by the network can be minimized.

The present inventors have recognized that it is desirable to develop a cross-layer scheduling method that takes into account network layer routing constraints, physical layer beamforming constraints, as well as MAC layer scheduling constraints. Consider a wireless network, such as the wireless multi-hop backhaul network discussed above that has, illustratively, a set N of APs. From each AP n∈N, traffic is injected into the network at the rate of $s_n$. The set of links between the APs is denoted by L. Each link l∈L is unidirectional. As one skilled in the art will recognize, directional links can be represented by a pair of unidirectional links with opposite directions. Assume there is a fixed transmission schedule of T slots represented by the active set of links $T_t$ for t=1, 2, ..., T. In each time slot t, the set of links in $T_t$ are activated for transmission. The links in the transmission set $T_t$'s are selected so as to satisfy any constraints on the radio hardware. Specifically, typical constraints on radio hardware in a wireless backhaul network are that an access point at a node cannot transmit and receive at the same time; an access point at a node cannot receive from multiple nodes at the same time; and an access point at a node cannot transmit to multiple destination nodes at the same time.

As one skilled in the art will recognize, the foregoing constraints are further limited by the need to prevent transmissions from one node from interfering with transmissions from or to other nodes. MAC scheduling of these transmissions becomes very important. Specifically, in order to prevent detrimental interference, it is important that the MAC scheduling scheme permit only a subset of the nodes to transmit simultaneously without resulting in detrimental interference with other nodes. Thus, as one skilled in the art will also recognize, overall network performance is highly dependent upon the selection of these subsets, also referred to herein as transmission sets. The selection of such transmission sets is discussed further herein below. However, for the purposes of the immediately following discussion, it is assumed that a feasible MAC transmission schedule has been provided. With such a transmission schedule, it is then possible to decouple the scheduling problem into network layer and PHY/MAC layer subproblems and to derive a distributed solution for network layer scheduling.

For each l∈$T_t$, define the link flow variable $x_l^t$ that represents the average traffic flow through link l in slot t. Then, the flow conservation law at each node n∈N can be written as $$\frac{1}{T}\sum_{t=1}^{T}\left(\sum_{l\in T_1\cap O(n)} x_l^t - \sum_{l\in T_1\cap I(n)} x_l^t\right) = s_n, \qquad \text{(Equation 1)}$$

where O(n) is the set of links emanating from node n, and I(n) is the set of links entering node n.

The link flow variables must also satisfy the link capacity constraints given by $x_l^t < c_l^t$, for all l∈$T_t$ and t=1, 2, ..., T, where $c_l^t$ is the physical layer capacity of link l in time slot t, determined by the physical layer resources such as power, bandwidth, etc. If the interference can be eliminated by orthogonal multiple access schemes such as FDMA or TDMA, the physical layer constraints can be typically described by linear constraints. However, in the present instance, beamforming is used to mitigate interference. Accordingly, the interference cannot be completely eliminated unless the number of antennas is very large. The link capacity is given by:

$$c_l^t = W\log_2(1+\kappa\Gamma_l^t), \qquad \text{(Equation 2)}$$

where the signal-to-interference-plus-noise-ratio (SINR) $\Gamma_l^t$ is given by $$\Gamma_l^t = \frac{G_{ll}^t P_l^t}{\sum_{l' \neq l, l' \in T_t} G_{ll'}^t P_{l'}^t + 1} \quad \text{(Equation 3)}$$

In Equation 2, W is the frequency bandwidth, and κ is the factor called the SNR gap that models the loss in the rate when using realistic modulation schemes. Without loss of generality, we set κ and W to one in the subsequent discussion. In Equation 3, $P_l^t$ is the transmit power at the transmitter of link l in the time slot t. One skilled in the art will recognize in Equation 3 that the variance of additive white noise has been normalized to unity. The total transmit power of the network is assumed to be no more than $P_{sum}$ in each time slot. R(l) and T(l) denote the receiving node and the transmitting node of link l, respectively. Then, $G_{ll'}^t$ is the channel gain from T(l') to R(l) at time slot t, which models the gain from the beamformers as well as path loss and fading which are assumed to be quasi-static. Define $w_l^t \in \mathbb{C}^M$ and $g_l^t \in \mathbb{C}^M$ as the receive and the transmit beamformer weights at R(l) and T(l), respectively, at time slot t, each normalized to unit norm. Here, M is the number of antenna elements in the APs, which is assumed the same number at each AP. One skilled in the art will recognize, in light of the teaching herein, that it is straightforward to vary the number of antennas at different APs. If the matrix channel from T(l') to R(l) by $H_{R(l)T(l')}$. Then, $G_{ll'}^t$ can be written as $$G_{ll'}^t = |w_l^{tH} H_{R(l),T(l')} g_{l'}^t|^2 \quad \text{(Equation 4)}$$

To ensure fairness, define S to be the fair per-AP throughput of the network. Then, the objective is to maximize the fair throughput given the constraints from the network and the PHY/MAC layers, expressed below as:

$$\max S \quad \text{(Equation 5)}$$

$$\text{subject to } \sum_{t=1}^{T} \left( \sum_{l \in T_t \cap O(n)} x_l^t - \sum_{l \in T_t \cap I(n)} x_l^t \right) = T s_n, \quad \text{(Equation 6)}$$
$$n \in N$$

$$S \leq s_n \quad n \in N \quad \text{(Equation 7)}$$

$$x_l^t \leq c_l^t = \log_2(1 + \Gamma_l^t), l \in T_t, t = 1, 2, \ldots, T \quad \text{(Equation 8)}$$

$$\sum_{l \in T_t} P_l^t \leq P_{sum}, t = 1, 2, \ldots, T. \quad \text{(Equation 9)}$$

$$\text{over } S \geq 0, s_n \geq 0, x_l^t \geq 0, P_l^t \geq 0, \quad \text{(Equation 10)}$$
$$\|g_l^t\| = 1, \|w_l^t\| = 1, l \in T_t, t = 1, \ldots T.$$

One skilled in the art will recognize that the above optimization problem represented by Equations 5-10 is not a convex problem. However, this non-convexity arises only due to the physical layer constraints. In fact, when the schedule sets $T_t$ are constructed such that strongly interfering links are not scheduled in the same time slot, and/or the number of antenna elements M is large, even the physical layer constraints become approximately convex, given the beamformers $w_l^t$ and $g_l^t$. Thus, to exploit the inherent separable structure of the problem, dual decomposition is applied. This approach has bearing on the primal-dual methods which also require a local convexity structure. One skilled in the art will recognize that the duality gap will be small if the non-convexity is mild. Hence, the primal variables recovered from the dual optimal variables will be close to the optimal point.

To further facilitate distributed implementation, the problem formulation in Equations 5-10 can be modified slightly. First, the objective function S is replaced by $$\sum_n s_n$$

and the constraint of Equation 7 is replaced by explicit equalities given by $S_{R(l)} = S_{T(l)}, l \in L$. To facilitate the recovery of the primal optimal variables from the dual variables, the optimization problem can be reformulated to state:

$$\min -\sum_{n \in N} \log s_n + \varepsilon \sum_{t=1}^{T} \sum_{l \in T_t} x_l^{t^2} \quad \text{(Equation 11)}$$

$$\text{subject to } \sum_{t=1}^{T} \left( \sum_{l \in T_t \cap O(n)} x_l^t - \sum_{l \in T_t \cap I(n)} x_l^t \right) = \quad \text{(Equation 12)}$$
$$T s_n, n \in N$$

$$s_{T(l)} = s_{R(l)}, l \in L \quad \text{(Equation 13)}$$

$$x_l^t \leq c_l^t = \log_2(1 + \Gamma_l^t), l \in T_t, t = 1, 2, \ldots, T \quad \text{(Equation 14)}$$

$$\sum_{l \in T_t} P_l^t \leq P_{sum}, t = 1, 2, \ldots, T \quad \text{(Equation 15)}$$

$$\text{over } s_n \geq 0, x_l^t \geq 0, P_l^t \geq 0, \|g_l^t\| = 1, \quad \text{(Equation 16)}$$
$$\|w_l^t\| = 1, l \in T_t, t = 1, \ldots, T.$$

The partial Langrangian for the above problem can be written as:

$$L(\{s_n\}, \{x_l^t\}, \{P_l^t\}, \{g_l^t\}, \{w_l^t\}, \{v_n\}, \{\lambda_l\}, \{p_l^t\}) = \quad \text{(Equation 17)}$$
$$-\sum_n \log s_n + \varepsilon \sum_t \sum_{l \in T_t} x_l^{t^2} +$$
$$\sum_n v_n \left[ \sum_t \left( \sum_{l \in T_n \cap O(n)} x_l^t - \sum_{l \in T_t \cap I(n)} x_l^t \right) - T s_n \right] +$$
$$\sum_l \lambda_l (s_{T(l)} - s_{R(l)}) + \sum_t \sum_{l \in T_t} p_l^t (x_l^t - c_l^t).$$

And the Lagrange dual function is then given by $$D(\{v_n\}, \{\lambda_l\}, \{p_l^t\}) = \sum_n \inf_{s_n \geq 0} \quad \text{(Equation 18)}$$
$$\left\{ -\log s_n + \left( -T v_n + \sum_{l \in O(n)} \lambda_l - \sum_{l \in I(n)} \lambda_l \right) s_n \right\} +$$

-continued $$\sum_{t}\sum_{l\in T_t} \inf_{x_l^{t2}\geq 0} \{\varepsilon x_l^{t2} + (v_{T(l)} - v_{R(l)} + p_l^t)x_l^t\} +$$

$$\inf_{\substack{\sum_t p_l^t\geq 0, \|g_l^t\|=1, \|w_l^t\|=1,\\ \sum_{l\in T_t} p_l^t \leq P_{sum}}} \left\{-\sum_{l\in T_t} p_l^t c_l^t\right\}.$$

Thus, given the dual variables $v_n^{(k)}$, $\lambda_l^{(k)}$ and $p_l^{t(k)}$ at the k-th iteration, the optimal primal variables $s_n^{*(k)}$ and $x_l^{t*(k)}$, respectively, can be recovered in closed form:

$$s_n^{*(k)} = \left[\frac{1}{-Tv_n^{(k)} + \sum_{l\in O(n)}\lambda_l^{(k)} - \sum_{l\in I(n)}\lambda_l^{(k)}}\right]^+ \quad \text{(Equation 19)}$$

$$x_l^{t*(k)} = \left[-\frac{1}{2\varepsilon}\left(v_{T(l)}^{(k)} - v_{R(l)}^{(k)} + p_l^{t(k)}\right)\right]^+, \quad \text{(Equation 20)}$$

where $(\cdot)^+ = \max\{0, \cdot\}$. Assuming that the solution for $c_l^t$ in Equation 18 has been found, the updates for the dual variables are given by the equations:

$$v_n^{(k+1)} = \quad \text{(Equation 21)}$$
$$v_n^{(k)} + \alpha_k\left[\sum_t\left(\sum_{l\in T_t\cap O(n)} x_l^{t*(k)} - \sum_{l\in T_t\cap I(n)} x_l^{t*(k)}\right) - Ts_n^{*(k)}\right]$$

$$\lambda_l^{(k+1)} = \lambda_l^{(k)} + \alpha_k\left\lfloor s_{T(l)}^{*(k)} - s_{R(l)}^{*(k)}\right\rfloor \quad \text{(Equation 22)}$$

$$p_l^{t(k+1)} = \left[p_l^{t(k)} + \alpha_k(x_l^{t*(k)} - c_l^{t*(k)})\right]^+. \quad \text{(Equation 23)}$$

One skilled in the art will recognize that these update equations are an instance of the subgradient method since the quantities in the brackets in Equations 21, 22 and 23 are the subgradients of $D(\cdot)$ with respect to $v_n$, $\lambda_l$, and $p_l^t$, respectively. One skilled in the art will also recognize that various convergence results have been established for such a subgradient method, especially for the diminishing step size $\alpha_k$ that satisfies $$\alpha_k \to 0, \sum_{k=0}^{\infty}\alpha_k = \infty. \quad \text{(Equation 24)}$$

Thus, according to the foregoing discussion, the dual decomposition approach decouples the overall problem into smaller subproblems corresponding to the network layer and the PHY/MAC layer. Coordinating the different layer problems are the set of dual variables $p_l^t$. The network layer solves the first and the second minimization problems in Equation 18 which includes the cost of using the physical layer resource in the form of $\Sigma_t\Sigma_{l\in T_t}p_l^t x_l^t$, while the physical layer maximizes the revenue generated by supplying the resource in the third minimization in Equation 18. The price update Equation 23 essentially represents the tatonnement procedure based on the law of supply and demand. As one skilled in the art will recognize, this tatonnement procedure is a procedure that matches supply and demand in a market of perfect competition. Moreover, the level of decomposition of the network layer problem can be applied to the individual node/link level, such that the developed algorithm in Equations 19-23 can be fully distributed. However, in order to achieve such full distribution, it is necessary to solve the physical layer problem in a distributed or semi-distributed manner.

As will be clear to one skilled in the art, any semi-distributed algorithm at the PHY layer needs to minimize the global message traffic overhead. Thus the following problem must be solved at the physical layer for each t=1, 2, . . . , T:

$$\max\sum_{l\in T_t} p_l^t\log_s(1 + \Gamma_l^t) \quad \text{(Equation 25)}$$

$$\text{subject to } \sum_{l\in T_t} P_l^t \leq P_{sum} \quad \text{(Equation 26)}$$

$$\text{over } P_l^t \geq 0, \|w_l^t\| = \|g_l^t\| = 1, l\in T_t, \quad \text{(Equation 27)}$$

where the variables are as described previously herein above. This is a weighted sum capacity maximization problem when using linear receive and transmit beamforming and when treating other link signals as interference.

As will be clear to one skilled in the art, determining a distributed optimal beamforming is possible by modeling the transmit beamforming problem as a virtual uplink which can, in turn, be generalized as network duality in multi-point networks such as the multi-hop backhaul network discussed herein above. Then, given a set of SINR targets for the links in the downlink, it can be shown that there is a dual receive beamforming problem in the uplink that achieves the same SINR targets using the same total transmit power as in the downlink. Accordingly, since the receive beamforming problem is easier to solve, one can solve the virtual uplink problem to eventually find the downlink solution. A distributed algorithm results because the virtual uplink can exist if the channel reciprocity condition $$H_{R(l),T(l')} = H_{T(l'),R(l)}^T \quad \text{(Equation 28)}$$

holds for all l and l', and the noise figures in the uplink/downlink receivers are matched. Thus, instead of solving a fictitious uplink problem in a centralized processor, both the downlink and the uplink problems can be solved by the actual network in a distributed manner.

An iterative minimum mean square error (IMMSE) algorithm for joint beamforming and power control in ad hoc wireless networks, discussed herein above, is used to solve the physical layer subproblem. Once again, FIG. 3 shows the IMMSE algorithm. Here, the variables associated with the virtual uplink problem are denoted by placing a tilde on top of the original notations. Specifically, as used herein below, $g_{-l}$ denotes $\{g_{l'}|l'\in T, l'\neq l\}$. $\tilde{g}_{-l}$, $P_{-l}$ and $\tilde{P}_{-l}$ are also defined similarly. $\bar{g}$ denotes the complex conjugate of the vector g. The interference plus noise covariance matrix at node R(l) is given by:

$$R_l^t(g_{-l}^t, P_{-l}^t) = \sum_{\substack{l'\neq l\\l'\in T_t}} P_{l'}^t H_{R(l),T(l')} g_{l'}^t \bar{g}_{l'}^{tH} H_{R(l),T(l')}^H + I. \quad \text{(Equation 29)}$$

One skilled in the art will recognize that, therefore, the matrix $\tilde{R}_l^t$ at T(l) is similarly defined.

Input to the IMMSE at step 301 of FIG. 3 algorithm are the active link set T, and the target SINRs $\gamma_l$ for l∈T. In each sub-iteration q, all the active transmitters T(l) transmit packets to their corresponding destinations. Then, at the destinations R(l), the beamformers are updated. Next, at step 302, the algorithm considers the case where packets are transmitted in the reverse directions: i.e., nodes R(l) now transmit packets to T(l). In this virtual uplink transmission, nodes T(l) update the (virtual) receive beamformers. The transmit beamformers are set to the complex conjugate of the receive beamformers to take advantage of the network duality. One skilled in the art will recognize that the receive beamformer computation can be performed by various adaptive algorithms using the training sequences present in the packet. The packets must also feedback the estimated SINR values so that the transmit powers can be updated to meet the SINR targets.

In order to apply this technique to the physical layer subproblem, appropriate target SINR values must be computed and transmitted to the transmit and receive nodes at step 303 of FIG. 3. Here, for simplicity, the use of a water-filling-type algorithm is considered. As will be clear to one skilled in the art, the water-filling algorithm is used to compute optimal transmit power allocated to a set of parallel channels to maximize the total capacity. Such an algorithm that solves the cross-layer problem, including the physical layer, is shown in FIG. 4. Referring to that figure, $(\cdot)^+$ denotes $\max\{0,\cdot\}$; $s_n^{*(k)}$ and $x_l^{*(k)}$ are the traffic injection rate at node n and the traffic flow rate through link l, respectively, at iteration k; and $\lambda_l^{(k)}$, $v_n^{(k)}$, $p_l^{t(k)}$ are the dual variables (Lagrange multipliers) at iteration k. The update can be started from any initial point and converges to the optimum value with a properly chosen step sizes $\alpha_k > 0$. For example, the step sizes can be chosen to satisfy $\alpha_k \to 0$ and $\Sigma_k \alpha_k = \infty$. At step 401, therefore, the optimal transmit injection rate and the traffic flow rates are updated and, then at step 402, the IMMSE algorithm of FIG. 3 is called to update the PHY layer parameters.

An algorithm such as that shown in FIG. 4 is useful because, if interference is mitigated sufficiently well by beamforming (that is, $G_{ll'} \approx 0$ for $l \neq l'$), the links can be closely modeled by the parallel channel. Thus, the power allocation problem can be solved by water-filling, except that, in our case, the weighting has to be taken into account. Given the channel gains $G_{ll'}^t$ for $l \in T_t$, the target SINR $\gamma_l^t$ for link $l \in T_t$ is given by:

$$\gamma_l^t = (r^t p_l^t G_{ll}^t - 1)^+ \quad \text{(Equation 30)}$$

where $r^t \geq 0$ is the "water level" adjusted so as to satisfy the condition $$\sum_{l \in T_t} P_l^t = P_{sum}.$$

To determine the value of $r^t$, a central processor collects the transmit powers of all the active nodes in the network and performs the following adaptation:

$$\gamma^{t(k+1)} = \gamma^{t(k)} + \alpha_k \left( P_{sum} - \sum_{l \in T_t} P_l^t \right) \quad \text{(Equation 31)}$$

Since the update of the beamformers affects the channel gains $G_{ll}$, the convergence of the update Equation 30 cannot be guaranteed. A suboptimal heuristic that does not depend on the values of $G_{ll}$ would be to set the target SINR proportional to $p_l^t$:

$$\gamma_l^t = r^t p_l^t. \quad \text{(Equation 32)}$$

Figure 5:
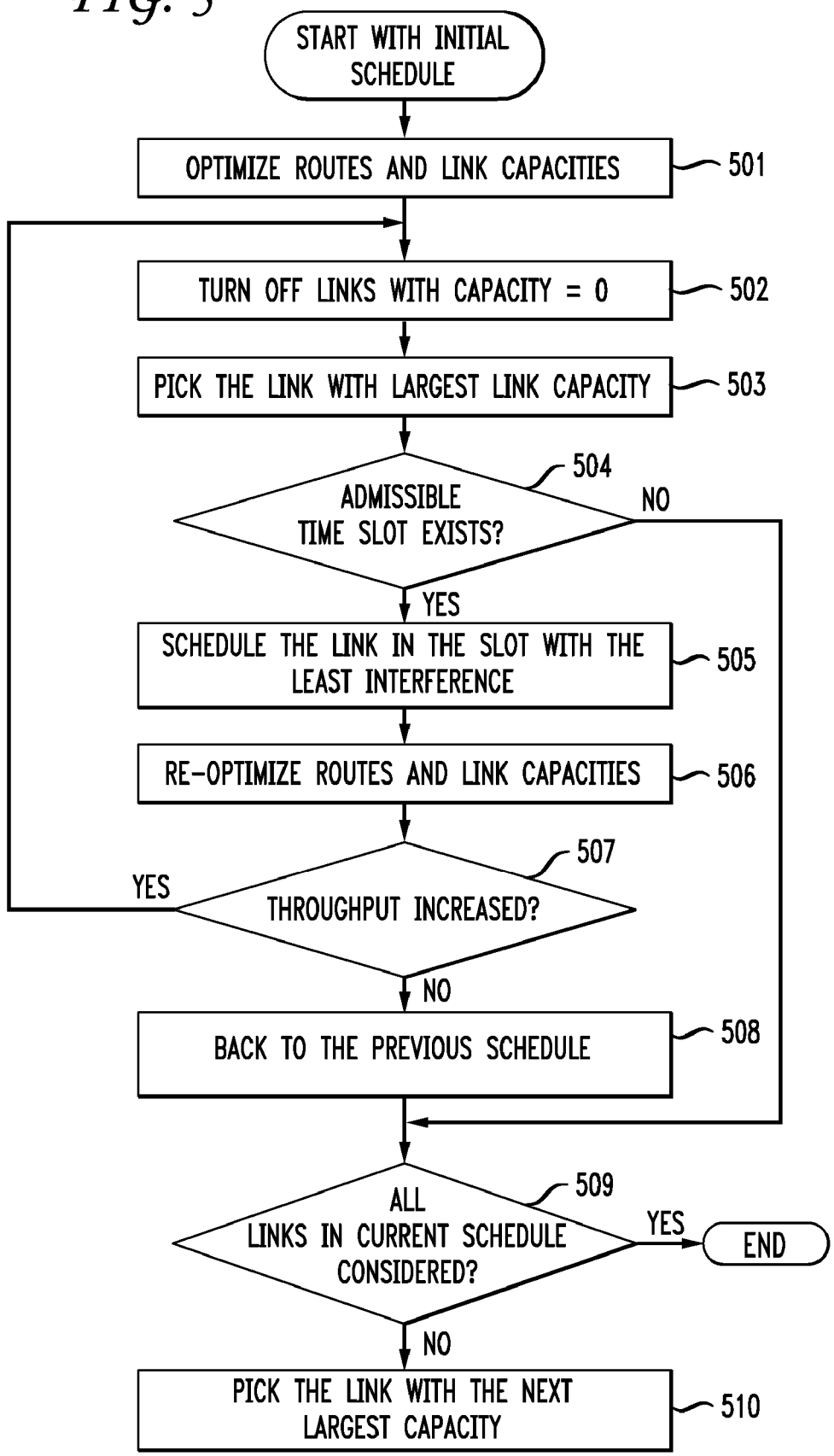
FIG. 5 is a flow chart representing an algorithm for heuristically selecting MAC layer transmission sets.

As discussed above in developing a cross-layer solution to the network and PHY/MAC subproblems, it was assumed that the transmission schedule at the MAC layer represented by $T_t$, $t = 1, \ldots, T$, was already given. However, in practice it is necessary to determine such a schedule. Therefore, in accordance with a first embodiment of the present invention, a heuristic algorithm is used to produce an improved choice of transmission sets. This algorithm, as represented by the flowchart of FIG. 5, deactivates links that have minimal link capacity, and schedules in additional time slots those links at the MAC layer that have high demand of capacity. The algorithm starts with an initial schedule $T_t$, $t = 1, 2, \ldots, T$, that has all the links scheduled at least once. For this given schedule, at step 501, the optimization is performed to find the optimal route and physical layer parameters using the algorithm in FIG. 4. Then, at step 502, the links with the optimized link capacity $c_l^{t*}$ smaller than a threshold $\delta_c$ are taken out of the transmission sets. After that, at step 503, the algorithm picks the link with the highest link capacity $c_l^{t*}$, over all l and t and see if this link is admissible in the other time slots under the half-duplex transceiver constraints, succeed above. Then, at step 504, a determination is made if there are admissible time slots. If there is no such time slot, then at steps 509 and 510 the algorithm tries the link with the next highest link capacity. If there are multiple time slots that can accommodate the chosen link, at step 505 the time slot with the least interference to this link is selected. Then, at step 506, the routes and link capacities are re-optimized and at step 507, a determination is made whether throughput is increased. If throughput is not increased, then the previous schedule is used since that schedule produced better scheduling results. If throughput is increased, however, then the algorithm proceeds to steps 509 and 510 to consider the link with the next largest capacity until all links have been considered. For the purpose of estimating the amount of interference that would be imposed to the new link in each time slot, the beamformers of the chosen link are set to the optimal beamformers under the zero-interference condition.

While the forgoing embodiment of heuristically determining an acceptable transmission set is advantageous, the present inventors have recognized that it may be desirable in some implementations to determine a plurality of independent transmission sets, also referred to herein as independent sets (ISs), systematically. As discussed above, scheduling at the medium access layer is subject to at least two constraints: 1) each node in the network cannot simultaneously transmit and receive in the same channel; and 2) a transmission can experience interference from neighboring nodes. Thus, each IS represents a subset of links that satisfies both of these constraints (e.g., does not attempt to transmit or receive simultaneously and is not interfered with by a neighboring link) and, as a result, can be active at the same time. As one skilled in the art will recognize, an ideal MAC scheduling algorithm would activate as many links as possible. In a random access type MAC protocol such as the well-known IEEE 802.11 Distributed Coordination Function (DCF) protocol, collision avoidance is achieved through carrier sensing and the similarly well-known Request to Send/Clear to Send (RTS/CTS) handshaking mechanism. However, the spatial reuse in the DCF factor is low due to the distributed nature of the protocol. While in a scheduling type protocol such as the also well-known IEEE 802.16 (WiMax) standard, conflict resolution can be attained by centralized link scheduling to optimize spatial reuse and resource allocation.

We denote all the ISs in the network as $\{T_i, i=1, \ldots, I\}$, where $T_i$ is a column vector with:

$$T_i(l) = \begin{cases} 1, & \text{if link l is active in } ISi, \\ 0, & \text{otherwise.} \end{cases} \quad \text{(Equation 33)}$$

Therefore, a schedule can be defined as the set $\{(T_i, \lambda_i), i=1, \ldots, I\}$, where $\lambda_i$ is the fraction of time IS i is activated during the time duration considered for scheduling. A valid MAC schedule must satisfy the condition $$\sum_{i=1}^{I} \lambda_i \leq 1.$$

In light of the foregoing, in order to develop a systematic approach for identifying the ISs for use in MAC scheduling, assume the aggregate traffic rate to be transmitted over the backhaul network to a centralized base station (BS) is $s_n$ bits per second at backhaul node n. Let $S=(s_1, \ldots, s_N)'$ denote traffic demand vector for the nodes $n=1, \ldots, N$. Given the traffic demands vector S, it is necessary to determine the optimal routing and scheduling schemes to balance the traffic load and optimize network resource utilization. As one skilled in the art will recognize, in multi-hop wireless networks, the effective MAC layer link capacity is different from the physical layer link capacity $c_l$. Given a schedule $\{T_i, \lambda_i, i=1, \ldots, I\}$, the effective MAC layer link capacity is $c_l \Sigma_{i \in I} T_i(l) \lambda_i$. Therefore, as discussed herein above, the routing and scheduling are tightly coupled. Once again, it is useful to use a cross-layer design, breaking up the routing and scheduling problems into separate subproblems, to solve the joint optimization problem, with $$\sum_{i=1}^{I} \lambda_i$$

as the optimization goal, which represents the schedule time length to meet a pre-specified traffic demand. It is also referred to as the "cost" for the problem, discussed further herein below. Let $x_l$ denote the traffic flow that is assigned to link l by the routing scheme. In such a case, the joint routing and scheduling (JRS) problem is formulated as:

$$\min U(\lambda) = \sum_{i \in I} \lambda_i \quad \text{(Equation 34)}$$

$$\text{subject to } \sum_{l \in O(n)} x_l - \sum_{l \in I(n)} x_l = s_n, n \in N \quad \text{(Equation 35)}$$

$$\sum_{i \in I} T_i(l) \lambda_i \geq \frac{x_l}{c_l}, l \in L \quad \text{(Equation 36)}$$

$$x_l \geq 0, \gamma_i \geq 0.$$

As one skilled in the art will recognize, Equation 35 is a constraint that represents the flow conservation law at each node n in the network, where, as discussed above, O(n) is the set of links that are outgoing from node n, and I(n) is the set of links that are incoming to node n. Equation 36 is a constraint that the effective MAC layer link capacity of each link l must be greater or equal to the flow rate that is assigned to it. For a large network size such as is typical in today's backhaul networks, it is impractical to solve the foregoing JRS problem because, in such a network, the number of potential ISs grows exponentially with network size and, therefore, becomes a computationally difficult problem. This computational difficulty is compounded by the cross-layer approach discussed herein above where a beamforming algorithm such as the IMMSE algorithm is used to determine physical layer accessibility and to then determine the corresponding power vectors and beamforming patterns.

Therefore, in order to reduce this computational difficulty, it may be noted that, at any given instant, most of the ISs are not used and/or the time $\lambda_i$ a particular IS is active during a scheduling period is negligible small. Hence, with these simplifications in mind, one method of solving the above problem is to find a small subset of the ISs $I' \subset I$ such that the solution to a modified JRS problem (with the above simplifications) is equal or very close to the optimum of the original problem as stated in Equation 34. In such a case, Equations 34-36 then become:

$$\min U(\lambda) = \sum_{i \in I'} \lambda_i \quad \text{(Equation 37)}$$

$$\text{subject to } \sum_{l \in O(n)} x_l - \sum_{l \in I(n)} x_l = s_n, n \in N \quad \text{(Equation 38)}$$

$$\sum_{i \in I} T_i(l) \lambda_i \geq \frac{x_l}{c_l}, l \in L \quad \text{(Equation 39)}$$

$$x_l \geq 0, \lambda_i \geq 0$$

In order to determine such a subset of ISs a column generation approach may be used. As one skilled in the art will recognize, a column generation technique is a widely known technique used in integer program for dealing with prohibitively large number of variables by concentrating on a sufficiently meaningful subset of the variables. Here we apply such a column generation technique to the JRS problem of Equation 34, which is a linear programming (LP) with an exponential number of variables. In such an application, the columns correspond to the vectors $\{T_i, i \in I\}$ in this problem. Column generation of the LP problem of Equation 34 provides a decomposition of the problem into a master problem represented by Equation 37-39 and a subproblem represented by Equations 40-41. The subproblem, which is a separation problem for the dual LP, is then solved in order to identify a new column. If such a new column is found, the cost of the LP is reduced by adding in this new column. The optimum of the original problem is achieved when the cost cannot be reduced any more by adding any new column $i \in I \backslash I'$.

As discussed above, the master problem of Equation 37 is the problem of Equation 34 restricted to a subset of columns $I' \subseteq I$. Initially, $I_0$ can be chosen to the set of columns where each column contains one single link of the network. This corresponds, for example, to the simplest possible TDMA schedule. When the problem of Equation 37 is solved, we obtain the optimal dual variables $\{\pi_l, l \in L\}$ corresponding to the inequality constraints of Equation 39. Then the dual cost function for column k is evaluated as $\overline{c}_k = 1 - \Sigma_{l \in L} T_k(l) \pi_l, k \in I$. It is then possible to identify a new column by examining whether any of the columns $k \in I' \subseteq I$ has a negative cost $\overline{c}_k$. If all the columns have a positive cost, optimality is achieved. Such optimality may be achieved by minimizing the reduced cost $\bar{c}_k$ for all the columns in the set $I' \subseteq I$. Accordingly, the minimum reduced cost subproblem can be expressed as:

$$\min_{k \in N'} \bar{c}_k = 1 - \max_{k \in N'} \sum_{l \in L} T_k(l) \pi_l \quad \text{(Equation 40)}$$

$$\text{subject to } \sum_{l \in L} T_k(l) \pi_l > 1, k \in I \quad \text{(Equation 41)}$$

To keep the size of the set I' from increasing, another IS k' can be removed from I' such that $\Sigma_{l \in L} T_{k'}(l) \pi_l < 1$ each time a new IS k is added.

Note that in the above problem $\Sigma_{l \in L} T_k(l) \pi_l$ is the sum of the weight of the links in the IS $T_k$, where the weight of each link corresponds to the optimal dual price generated by the simplified JSR problem of Equations 37-39. As a result, Equation 40 is equivalent to a Maximum Weighted Independent Set (MWIS) problem with the restriction that the sum weight of the links in the IS be greater than one. As such an MWIS problem is computationally difficult, in one embodiment the problem is solved heuristically. Here a simple greedy algorithm as shown in FIG. 6 is used to find a maximal weighted independent set $T_k$ as a new column to enter. As shown in FIG. 6, in steps 601-603, an iterative approach is used for selecting the links in an independent set $T_k$ in order to find that set of links that does not transmit and receive simultaneously (i.e., avoid any primary conflicts). Then, at steps 604-605, the signal to noise ratio is evaluated across these links in order to ensure that a transmission does not experience interference from neighboring nodes (i.e., to avoid any secondary conflicts). Thus, according to the algorithm of FIG. 6, an MWIS can be identified.

If $T_k$ found by the algorithm of FIG. 6 already exists in I' or, alternatively, the sum weight $\Sigma_{l \in L} T_k(l) \pi_l < 1$, then the column generation procedure termninates. Because a greedy algorithm is used to solve the subproblem at each step, the algorithm may terminate before the optimum of the original problem is achieved. However, with the column generation approach discussed above, at each step a better solution is achieved for the original problem by finding a new IS. Hence, according to the foregoing method, while the precise optimum may not be achieved, at a minimum a sub-optimum will be attained. Once the independent sets are identified, we can solve the simplified JSR problem to find the optimal routing and scheduling solutions.

One skilled in the art will recognize that, due to the above decomposition of the network routing, MAC layer scheduling and physical layer beamforming problems, cross-layer calculations can be implemented in a distributed or semi-distributed fashion. FIG. 7 shows a block diagram of an illustrative computer 707 that can be used at a network node, such as an access point or a node associated with such an access point similar to nodes 110-160 in FIG. 1, and that is adapted to perform calculations associated with the above network routing algorithm, including the aforementioned medium access control and beamforming calculations. Referring to FIG. 7, computer 707 is adapted to receive store and transmit data such as the aforementioned network routing, beamforming and medium access control data. Illustrative computer 707 may have, for example, a processor 702 (or multiple processors) which controls the overall operation of the computer 707. Such operation is defined by computer program instructions stored in a memory 703 and executed by processor 702. The memory 703 may be any type of computer readable medium, including without limitation electronic, magnetic, or optical media. Further, while one memory unit 703 is shown in FIG. 7, it is to be understood that memory unit 703 could comprise multiple memory units, with such memory units comprising any type of memory. Computer 707 also comprises illustrative network interface 704 for use in programming the computer and/or to facilitate the use of the computer 707 in a wired network application. Computer 707 also illustratively comprises a storage medium, such as a computer hard disk drive 705 for storing, for example, data and computer programs adapted for use in accordance with the principles of the present invention as described hereinabove. Computer 707 also illustratively comprises an illustrative amplifier 701 and antenna 708, such as the amplifier and antenna of an 802.11 wireless access point, for transmitting the aforementioned calculations in a wireless network. One skilled in the art will recognize that the amplifier 701 and antenna 708 may be separate from computer 707 with equally advantageous results. One skilled in the art will also recognize that computer 707 is merely illustrative in nature and that various hardware and software components may be adapted for equally advantageous use in accordance with the principles of the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for use in a distributed wireless communication network, comprising:
   receiving an indication of a set of nodes in said network to transmit over a corresponding set of links in said network;
   determining for each node in said set of nodes an optimal rate of transmission;
   determining for each link in said set of links an optimal rate of traffic flow;
   calculating a target signal to noise ratio over each of said links;
   calculating beamformer weights and transmit powers for each node as a function of said target signal to noise ratio, and
   wherein said optimal rate of transmission from each node is based on the equation:

$$s_n^{*(k)} = \left[ \frac{1}{-T v_n^{(k)} + \sum_{l \in O(n)} \lambda_l^{(k)} - \sum_{l \in I(n)} \lambda_l^{(k)}} \right]^+$$

where $s_n^{*(k)}$ is the optimal value for the rate of transmission from node n at iteration k;
T is the period of the transmission schedule; O(n) is the set of links emanating from node n; I(n) is the set of links entering node n; and $v_n^{(k)}$ and $\lambda_l^{(k)}$ are Lagrangian dual variables at iteration k.

2. The method of claim 1 further comprising calculating a transmit beam from each node in said set of nodes as a function of said beamformer weights, transmit powers, optimal rate of transmission and optimal rate of traffic flow.

3. The method of claim 1 wherein said indication of said set of nodes is received from a MAC layer in said network.

4. The method of claim 1 wherein said optimal traffic flow for each link is calculated by the equation:

$$x_l^{t*(k)} = \left[-\frac{1}{2\varepsilon}\left(v_{T(l)}^{(k)} - v_{R(l)}^{(k)} + p_l^{t(k)}\right)\right]^+,$$

where $x_l^{t*(k)}$ is the optimal average traffic flow through link l at time slot t and iteration k; R(l) and T(l) denote the receiving node and the transmitting node of link l, respectively; and $v_n^{(k)}$ and $p_l^{t(k)}$ are Lagrangian dual variables at iteration k.

5. The method of claim 1 wherein said target signal to noise ratio is calculated as a function of a water filling type algorithm.

6. The method of claim 5 wherein said target signal to noise ratio is defined by the equation:

$$\gamma_l^t = (r^t p_l^t G_{ll}^t - 1)^+$$

where $\gamma_l^t$ is the signal to noise ratio target over link l at time t; $r^t$ is said variable adjusted so as to satisfy the condition $$\sum_{l \in T_t} P_l^t = P_{sum}$$

and $r^t \geq 0$; $P_l^t$ is the transmit power over link l at time slot t; $P_{sum}$ is the total available transmit power; and $p_l^t$ is the Lagrangian dual price.

7. The method of claim 5 wherein said target signal to noise ratio is defined by the equation:

$$\gamma_l^t = r^t p_l^t$$

where $\gamma_l^t$ is the signal to noise ratio target over link l at time t; $r^t$ is said variable adjusted so as to satisfy the condition $$\sum_{l \in T_t} P_l^t = P_{sum}$$

and $r^t \geq 0$, with all link capacities transmit capacities being equal; $P_l^t$ is the transmit power over link l at time slot t; $P_{sum}$ is the total available transmit power; and $P_l^t$ is the Lagrangian dual price.

8. The method of claim 1 wherein said target signal to noise ratio is iterated for each transmit slot and each link to transmit in said transmit slot.

9. The method of claim 8 wherein said target signal to noise ratio is iterated according to the equation:

$$\gamma^{t(k+1)} = \gamma^{t(k)} + \alpha_k\left(P_{sum} - \sum_{l \in T_t} P_l^t\right);$$

where $\gamma_l^{t(k+1)}$ is the signal to noise ratio target at iteration k+1 over link l at time slot t; $\gamma_l^{t(k)}$ is the signal to noise ratio target at iteration k over link l at time slot t; $P_l^t$ is the transmit power over link l at time slot t; $P_{sum}$ is the total available transmit power; and $\alpha_k$ is a small variable greater than 0 chosen as appropriate step sizes for each iteration in a way to satisfy $\alpha_k \to 0$ and $\Sigma_k \alpha_k = \infty$.

10. The method of claim 1 wherein said indication of said set of nodes in said network to transmit over a corresponding set of links in said network is received from a MAC layer in said network.

11. The method of claim 10 wherein said indication is determined heuristically.

12. The method of claim 11 wherein said indication comprises an indication of which nodes in said set of nodes are permitted to transmit over which links in said of links.

13. The method of claim 12 wherein said indication is determined at the MAC layer by the steps of:
   optimizing a transmission capacity for each link in said set of links;
   deleting from consideration any links wherein said capacity is close to 0;
   selecting a first link having a highest link transmission capacity;
   if an admissible time slot exists, scheduling said first link in a time slot having a lowest interference; and
   determining if an overall throughput in said network is increased.

14. The method of claim 10 wherein said indication is determined systematically.

15. The method of claim 14 wherein said indication comprises at least a first independent set of links over which to transmit at a particular time.

16. The method of claim 15 wherein said independent sets are determined by a column generation algorithm.

17. The method of claim 16 wherein said column generation algorithm comprises determining a maximal weighted independent set of links.

18. The method of claim 17 wherein said column generation algorithm comprises the steps of:
   determining a set of links in a way such that no link in said set of links is scheduled to both transmit and receive a communication in the network simultaneously;
   calculating beamforming weights and transmit powers at the physical layer in order to determine whether a transmission over a link in said set interferes with a transmission from any other link.

19. The method of claim 18 further comprising:
   calculating a minimized cost associated with a plurality of columns, said plurality of columns representative of an independent set of links.

20. The method of claim 19 wherein said minimized cost is calculated according to the equation:

$$\min_{k \in I \setminus I'} \overline{c_k} = 1 - \max_{k \in I \setminus I'} \sum_{l \in L} T_k(l)\pi_l$$

$$\text{subject to } \sum_{l \in L} T_k(l)\pi_l > 1, k \in I$$

where $\overline{c_k}$ is the reduced cost for all the columns in the set $I' \subseteq I$: k is the independent set; $T_k(l)$ is an indicator function yielding 1 if link l is active in the independent set k, and 0 otherwise; and $\pi_l$, is an optimal dual variable.

21. The method of claim 15 wherein said independent set is identified by the steps of:
   iteratively determining that a set of links does not experience any primary conflicts; and
   iteratively determining that said set of links does not experience any secondary conflicts.

22. The method of claim 21 wherein said primary conflicts comprise interference resulting from attempted simultaneous transmission and reception at a node in said network.

23. The method of claim 21 wherein said secondary conflicts comprise interference to a transmission, said interference caused by a transmission originating from a neighboring node.

24. An apparatus for use in a distributed wireless communication network, comprising:
  means for receiving an indication of a set of nodes in said network to transmit over a corresponding set of links in said network;
  means for determining for each node in said set of nodes an optimal rate of transmission;
  means for determining for each link in said set of links an optimal rate of traffic flow;
  means for calculating a target signal to noise ratio over each of said links;
  means for calculating beamformer weights and transmit powers for each node as a function of said target signal to noise ratio; and
  wherein said means for determining an optimal traffic flow for each link comprises means for calculating the equation:

$$x_l^{t*(k)} = \left[ -\frac{1}{2\varepsilon} \left( v_{T(l)}^{(k)} - v_{R(l)}^{(k)} + p_l^{t(k)} \right) \right]^+,$$

where $x_l^{t*(k)}$ is the optimal average traffic flow through link l at time slot t and iteration k; R(l) and T(l) denote the receiving node and the transmitting node of link l, respectively; and $v_n^{(k)}$ and $P_l^{t(k)}$ are Lagrangian dual variables at iteration k.

25. The apparatus of claim 24 further comprising means for calculating a transmit beam from each node in said set of nodes as a function of said beamformer weights, transmit powers, optimal rate of transmission and optimal rate of traffic flow.

26. The apparatus of claim 24 wherein said means for receiving an indication of said set of nodes comprises means for receiving said set from a MAC layer in said network.

27. The apparatus of claim 24 wherein said means for determining an optimal rate of transmission from each node comprises means for calculating the equation:

$$s_n^{*(k)} = \left[ \frac{1}{-Tv_n^{(k)} + \sum_{l \in O(n)} \lambda_l^{(k)} - \sum_{l \in I(n)} \lambda_l^{(k)}} \right]^+$$

where $s_n^{*(k)}$ is the optimal value for the rate of transmission from node n at iteration k; T is the period of the transmission schedule; O(n) is the set of links emanating from node n; I(n) is the set of links entering node n; and $v_n^{(k)}$ and $\lambda^{(k)}$ are Lagrangian dual variables at iteration k.

28. The apparatus of claim 24 wherein said means for calculating said target signal to noise ratio comprises means for calculating said target signal to noise ratio as a function of a water filling type algorithm.

29. The apparatus of claim 28 wherein said means for calculating said target signal to noise ratio comprises means for calculating the equation:

$$\gamma_l^t = (r^t p_l^t G_{ll}^t - 1)^+$$

where $\gamma_l^t$ is the signal to noise ratio target over link l at time t; $r^t$ is said variable adjusted so as to satisfy the condition $$\sum_{l \in T_t} P_l^t = P_{sum}$$

and $r^t \geq 0$; $P_l^t$ is the transmit power over link l at time slot t; $P_{sum}$ is the total available transmit power; and $p_l^t$ is the Lagrangian dual price.

30. The apparatus of claim 28 wherein said means for calculating said target signal to noise ratio comprises means for calculating the equation:

$$\gamma_l^t = r^t p_l^t$$

where $\gamma_l^t$ is the signal to noise ratio target over link l at time t; $r^t$ is said variable adjusted so as to satisfy the condition $$\sum_{l \in T_t} P_l^t = P_{sum}$$

and $r^t \geq 0$, with all link capacities transmit capacities being equal; $P_l^t$ is the transmit power over link l at time slot t; $P_{sum}$ is the total available transmit power; and $p_l^t$ is the Lagrangian dual price.

31. The apparatus of claim 24 further comprising means for calculating said target signal to noise ratio by iteration for each transmit slot and each link to transmit in said transmit slot.

32. The apparatus of claim 31 wherein said means for calculating said target signal to noise ratio by iteration comprises means for calculating the equation:

$$\gamma^{t(k+1)} = \gamma^{t(k)} + \alpha_k \left( P_{sum} - \sum_{l \in T_t} P_l^t \right),$$

where $\gamma_l^{t(k-1)}$ is the signal to noise ratio target at iteration k+1 over link l at time slot t; $\gamma_l^{t(k)}$ is the signal to noise ratio target at iteration k over link l at time slot t; $P_l^t$ is the transmit power over link l at time slot t; $P_{sum}$ is the total available transmit power; and $\alpha_k$ is a small variable greater than 0 chosen as appropriate step sizes for each iteration in a way to satisfy $\alpha_k \to 0$ and $\Sigma_k \alpha_k = \infty$.

33. The apparatus of claim 24 wherein said indication of said set of nodes in said network to transmit over a corresponding set of links in said network is received from a MAC layer in said network.

34. A method for use in a distributed wireless communication network, comprising:
  identifying a set of nodes in said network to transmit over a corresponding set of links in said network;
  determining for each node in said set of nodes an optimal rate of transmission;
  determining for each link in said set of links an optimal rate of traffic flow;
  calculating a target signal to noise ratio over each of said links; and
  calculating beamformer weights and transmit powers for each node as a function of said target signal to noise ratio, and wherein said optimal rate of traffic flow for each link is calculated by the equation:

$$x_l^{t*(k)} = \left[ -\frac{1}{2\varepsilon} \left( v_{T(l)}^{(k)} - v_{R(l)}^{(k)} + p_l^{t(k)} \right) \right]^+,$$

where $x_l^{t*(k)}$ is the optimal average traffic flow through link l at time slot t and iteration k; R(l) and T(l) denote the receiving node and the transmitting node of link l, respectively; and $v_n^{(k)}$ and $P_l^{t(k)}$ are Lagrangian dual variables at iteration k.

* * * * *